(12) United States Patent
Gopinath et al.

(10) Patent No.: US 10,380,345 B2
(45) Date of Patent: Aug. 13, 2019

(54) DELIVERING CONFIGURATION BASED SECURITY AND PROCESS WORKFLOWS

(71) Applicant: INTERNATIONAL BUSINESS MACHINES CORPORATION, Armonk, NY (US)

(72) Inventors: Arun K. Gopinath, Bangalore (IN); Sudheer Kumaramkandath, Bangalore (IN); Ramesh Chandra Pathak, Bangalore (IN); Suryanarayana Rao, Bangalore (IN)

(73) Assignee: International Business Machines Corporation, Armonk, NY (US)

( * ) Notice: Subject to any disclaimer, the term of this patent is extended or adjusted under 35 U.S.C. 154(b) by 176 days.

(21) Appl. No.: 15/664,723

(22) Filed: Jul. 31, 2017

(65) Prior Publication Data

US 2019/0034636 A1    Jan. 31, 2019

(51) Int. Cl.
G06F 21/57    (2013.01)
G06F 9/48    (2006.01)

(52) U.S. Cl.
CPC ............ *G06F 21/57* (2013.01); *G06F 9/4887* (2013.01)

(58) Field of Classification Search
CPC ...................................................... G06F 21/57
USPC ......................................................... 726/1
See application file for complete search history.

(56) References Cited

U.S. PATENT DOCUMENTS

| | | | |
|---|---|---|---|
| 7,293,743 B2 * | 11/2007 | Cepollina | B64G 1/007 244/158.6 |
| 7,587,724 B2 | 9/2009 | Yeap | |
| 9,208,328 B2 | 12/2015 | Russello et al. | |
| 2003/0188217 A1 | 10/2003 | Spiegel | |
| 2004/0117358 A1 * | 6/2004 | von Kaenel | G06Q 40/08 |

(Continued)

FOREIGN PATENT DOCUMENTS

| | | |
|---|---|---|
| CN | 1960273 | 5/2007 |
| CN | 106709283 A | 5/2017 |

OTHER PUBLICATIONS

Notification of Transmittal of the International Search Report and the Written Opinion of the International Searching Authority, or the Declaration (dated Dec. 5, 2018); International Application No. PCT/IB2018/055633; International filing date Jul. 27, 2018; 9 pages.

*Primary Examiner* — Jacob Lipman
(74) *Attorney, Agent, or Firm* — Schmeiser, Olsen & Watts; Mark C. Vallone

(57) ABSTRACT

An approach is provided for delivering a configuration based workflow in an IT system. A command initiated for execution is identified as being included in a list of commands. A set of parameters and pre-configured conditions associated with the identified command are determined. Validation action(s) that validate the command and are included in the configuration based workflow are determined. The validation action(s) are specified by respective interaction(s) with external system(s). Validation action(s) included in the configuration based workflow are performed by completing the interaction(s) with the external system(s) using the set of parameters. It is determined whether the validation action(s) are successfully completed. If the validation action(s) are successfully completed, the execution of the command is continued. If at least one of the validation action(s) is not successfully completed, the execution of the command is discontinued.

25 Claims, 6 Drawing Sheets

(56) References Cited

U.S. PATENT DOCUMENTS

| | | | |
|---|---|---|---|
| 2007/0033054 A1* | 2/2007 | Snitkovskiy | G10L 15/22 |
| | | | 704/275 |
| 2010/0218201 A1 | 8/2010 | Schneider | |
| 2011/0125503 A1* | 5/2011 | Dong | G10L 15/22 |
| | | | 704/275 |
| 2012/0284460 A1* | 11/2012 | Guda | G06F 3/061 |
| | | | 711/114 |
| 2014/0053073 A1 | 2/2014 | Guo | |

* cited by examiner

DELIVERING CONFIGURATION BASED SECURITY AND PROCESS WORKFLOWS

BACKGROUND

The present invention relates to managing information technology (IT) systems, and more particularly to validating commands that perform destructive actions and other critical IT system activities.

In response to a system administrator issuing a shutdown or reboot command in an IT system in a UNIX® environment, the IT system initiates a corresponding system shutdown or system reboot. If the IT system includes live applications or databases, the system terminates processes associated with the live applications or databases. If there are any database transactions happening at the time of the shutdown or reboot, corruption of data in the database may occur. Thus, if the shutdown or reboot command was unknowingly invoked due to human error, critical business functionalities are lost. In known IT system environments, there is no mechanism to control commands that are knowingly or unknowingly issued by a privileged (i.e., root) user which perform a system shutdown, system reboot, or other critical system activity. UNIX® is a registered trademark of X/Open Company, Ltd. located in Berkshire, United Kingdom.

Role based access control (RBAC) is a known model that controls access to operating systems and software. Within the RBAC model, access is granted based on the roles individual users have in the organization that uses the system. For example, with RBAC, a user administrator can add, change, or delete users without having access to more powerful commands a system administrator can execute and without having access to files a system administrator can access. RBAC solves the problem that may UNIX® systems have where "root" is used to gain complete access in order to do the simplest administrative tasks, which do not require super user access. Financial licensing applies to RBAC and is costly. Additional training is required to support RBAC. In the UNIX® market, it is difficult to find resources with knowledge of RBAC. Furthermore, an RBAC root user can still initiate a shutdown or other disruptive commands without any other stringent control being applied to the commands.

Another known access control system for UNIX® systems is eTrust® Access Control, which protects the information assets of computer centers by checking whether users who request services from the host operating system are authorized to access those services. eTrust® Access Control can be configured to prohibit invoking certain commands, but a root user can stop the eTrust service and then invoke the previously prohibited commands. Furthermore, the commands may be executed from the system console even if the eTrust® Access Control service is running.

SUMMARY

In one embodiment, the present invention provides a method of delivering a configuration based workflow in an IT system. The method includes a computer identifying a command as being included in a list of commands. The command is initiated for an execution. The method further includes in response to the step of identifying the command, the computer determining a set of parameters and pre-configured conditions associated with the identified command. The method further includes based on the set of parameters and the pre-configured conditions, the computer determining one or more validation actions that validate the command and are included in the configuration based workflow. The one or more validation actions are specified by respective one or more interactions with one or more external systems. The method further includes the computer performing the one or more validation actions included in the configuration based workflow by completing the one or more interactions with the one or more external systems using the set of parameters. The method further includes the computer determining whether the one or more validation actions are successfully completed. The method further includes if the one or more validation actions are successfully completed, the computer continuing the execution of the command, or if at least one of the one or more validation actions is not successfully completed, the computer discontinuing the execution of the command.

The aforementioned embodiment provides a security integration layer to interpret operating system commands and intercept commands from any source or tool (e.g., application programming interface (API) connection, maliciously written cron job, software agent, or software tool that attempts to perform a destructive action), and evaluate the commands against configuration rules and applications of customizable corporate security models before the commands reach the OS kernel, which prevents or reduces intentional and accidental errors made by system administrators, system operators, and other privileged users in complex IT environments, and thereby ensuring that critical business functionalities of an IT system are not lost.

In one optional aspect of the aforementioned embodiment, the method further includes the computer performing one or more additional actions other than discontinuing the execution of the command, if a validation action included in the one or more validation actions is not successfully completed. Performing the one more additional actions includes sending a notification indicating that the validation action was not successfully completed. The aforementioned aspect advantageously sends a notification that can alert an administrator to a potentially destructive command that was issued maliciously.

In another optional aspect of the aforementioned embodiment, the method includes the computer performing one or more additional actions other than the step of continuing the execution of the command, if a validation action included in the one or more validation actions is successfully completed. The aforementioned aspect advantageously performs additional action(s) that can shut down database instances prior to a system shutdown or reboot, which avoids a corruption of data.

In another optional aspect of the aforementioned embodiment, the step of completing the one or more interactions with one or more external systems includes completing an interaction with an external system selected from the group consisting of a configuration management database system, a ticketing system, a job scheduling system, a workload automation system, and an operations management system. The aforementioned aspect advantageously completes the interaction with an external system so that critical business functionalities provided by the external system are not adversely affected.

In another optional aspect of the aforementioned embodiment, the step of performing the one or more validation actions includes validating the command against multiple local security policies and policies of external systems which are interfacing systems to the IT system. The aforementioned aspect advantageously validates the command against both local security policies and policies of interfacing systems, which provides a stringent control over a system administrator's activities, thereby preserving critical business functionalities provided by the interfacing systems.

In another optional aspect of the aforementioned embodiment, the method includes, prior to the step of identifying the command, the computer receiving the command (i) from a software tool using an application programming interface (API) connection, (ii) as part of a job executing in the IT system, where the job is scheduled by a time-based job scheduler, or (iii) from a software agent. The aforementioned aspect advantageously provides stringent control over various potential sources of a command that may cause a destructive action or adversely affect a critical system activity, thereby preserving critical business functionalities.

In another optional aspect of the aforementioned embodiment, the method includes, prior to the step of identifying the command, the computer receiving the command from an operating system or sub-system of the operating system. The aforementioned aspect advantageously provides stringent control over sub-system sources of a command that may cause a destructive action or adversely affect a critical system activity, thereby preserving critical business functionalities.

In another optional aspect of the aforementioned embodiment, the method includes the computer generating the list of commands that perform respective critical activities of the IT system, where at least one of the commands performs an action that is destructive to the IT system. The aforementioned aspect advantageously generates the list of commands to efficiently provide a pre-configured list of commands with which a received command is compared. The pre-configuration of the commands in the list allows an efficient processing by the aforementioned method of only those commands that can affect a critical system activity.

The advantages discussed above also apply to the computer system and computer program product embodiments, which are summarized below.

In another embodiment, the present invention provides a computer program product including a computer readable storage medium and computer readable program code stored in the computer readable storage medium. The computer readable program code contains instructions that are executed by a central processing unit (CPU) of a computer system to implement a method of delivering a configuration based workflow in an IT system. The method includes the computer system identifying a command as being included in a list of commands. The command is initiated for an execution. The method further includes in response to the step of identifying the command, the computer system determining a set of parameters and pre-configured conditions associated with the identified command. The method further includes based on the set of parameters and the pre-configured conditions, the computer system determining one or more validation actions that validate the command and are included in the configuration based workflow. The one or more validation actions are specified by respective one or more interactions with one or more external systems. The method further includes the computer system performing the one or more validation actions included in the configuration based workflow by completing the one or more interactions with the one or more external systems using the set of parameters. The method further includes the computer system determining whether the one or more validation actions are successfully completed. The method further includes if the one or more validation actions are successfully completed, the computer system continuing the execution of the command, or if at least one of the one or more validation actions is not successfully completed, the computer system discontinuing the execution of the command.

In another embodiment, the present invention provides a computer system including a central processing unit (CPU); a memory coupled to the CPU; and a computer readable storage medium coupled to the CPU. The computer readable storage medium contains instructions that are executed by the CPU via the memory to implement a method of delivering a configuration based workflow in an IT system. The method includes the computer system identifying a command as being included in a list of commands. The command is initiated for an execution. The method further includes in response to the step of identifying the command, the computer system determining a set of parameters and pre-configured conditions associated with the identified command. The method further includes based on the set of parameters and the pre-configured conditions, the computer system determining one or more validation actions that validate the command and are included in the configuration based workflow. The one or more validation actions are specified by respective one or more interactions with one or more external systems. The method further includes the computer system performing the one or more validation actions included in the configuration based workflow by completing the one or more interactions with the one or more external systems using the set of parameters. The method further includes the computer system determining whether the one or more validation actions are successfully completed. The method further includes if the one or more validation actions are successfully completed, the computer system continuing the execution of the command, or if at least one of the one or more validation actions is not successfully completed, the computer system discontinuing the execution of the command.

In another embodiment, the present invention provides a method of delivering a configuration based workflow in an IT system. The method includes a computer intercepting a command from a software tool that initiates an action that is destructive to the IT system. The method further includes the computer identifying the intercepted command as being included in a pre-configured list of commands. The identified command is initiated for an execution. The method further includes, in response to the step of identifying the command, the computer determining a set of parameters and pre-configured conditions associated with the identified command. The method further includes, based on the set of parameters and the pre-configured conditions, the computer generating Extensible Markup Language (XML) data. The method further includes the computer communicating with external systems via a generic external system engine by using the XML data over SOAP over Hypertext Transfer Protocol over Transport Security Layer (HTTPS). The external systems include a ticketing system for the IT system and a job scheduling system for the IT system. The method further includes, in response to the step of communicating, the computer interfacing with the ticketing system in the configuration based workflow, which determines whether an approved change control exists for the identified command. The method further includes, in response to the step of communicating, the computer interfacing with the job scheduling system in the configuration based workflow, which determines whether backups within a predetermined time period prior to the identified command being intercepted are validated. The method further includes, if the approved change control exists and the backups are validated, the computer continuing the execution of the identified command, or if the approved change control does not exist, the computer terminating the execution of the identified command so that the IT system is not affected by the action that is destructive, or if the backups are not validated, the computer the computer terminating the execution of the identified command so that the IT system is affected by the action that is destructive.

In another embodiment, the present invention provides a computer program product including a computer readable storage medium and computer readable program code stored in the computer readable storage medium. The computer readable program code contains instructions that are executed by a central processing unit (CPU) of a computer system to implement a method of delivering a configuration based workflow in an IT system. The method includes the computer system intercepting a command from a software tool that initiates an action that is destructive to the IT system. The method further includes the computer system identifying the intercepted command as being included in a pre-configured list of commands. The identified command is initiated for an execution. The method further includes, in response to the step of identifying the command, the computer system determining a set of parameters and pre-configured conditions associated with the identified command. The method further includes, based on the set of parameters and the pre-configured conditions, the computer system generating Extensible Markup Language (XML) data. The method further includes the computer system communicating with external systems via a generic external system engine by using the XML data over SOAP over Hypertext Transfer Protocol over Transport Security Layer (HTTPS). The external systems include a ticketing system for the IT system and a job scheduling system for the IT system. The method further includes, in response to the step of communicating, the computer system interfacing with the ticketing system in the configuration based workflow, which determines whether an approved change control exists for the identified command. The method further includes, in response to the step of communicating, the computer system interfacing with the job scheduling system in the configuration based workflow, which determines whether backups within a predetermined time period prior to the identified command being intercepted are validated. The method further includes, if the approved change control exists and the backups are validated, the computer system continuing the execution of the identified command, or if the approved change control does not exist, the computer system terminating the execution of the identified command so that the IT system is not affected by the action that is destructive, or if the backups are not validated, the computer system the computer system terminating the execution of the identified command so that the IT system is affected by the action that is destructive.

DETAILED DESCRIPTION

Overview

Figure 1:
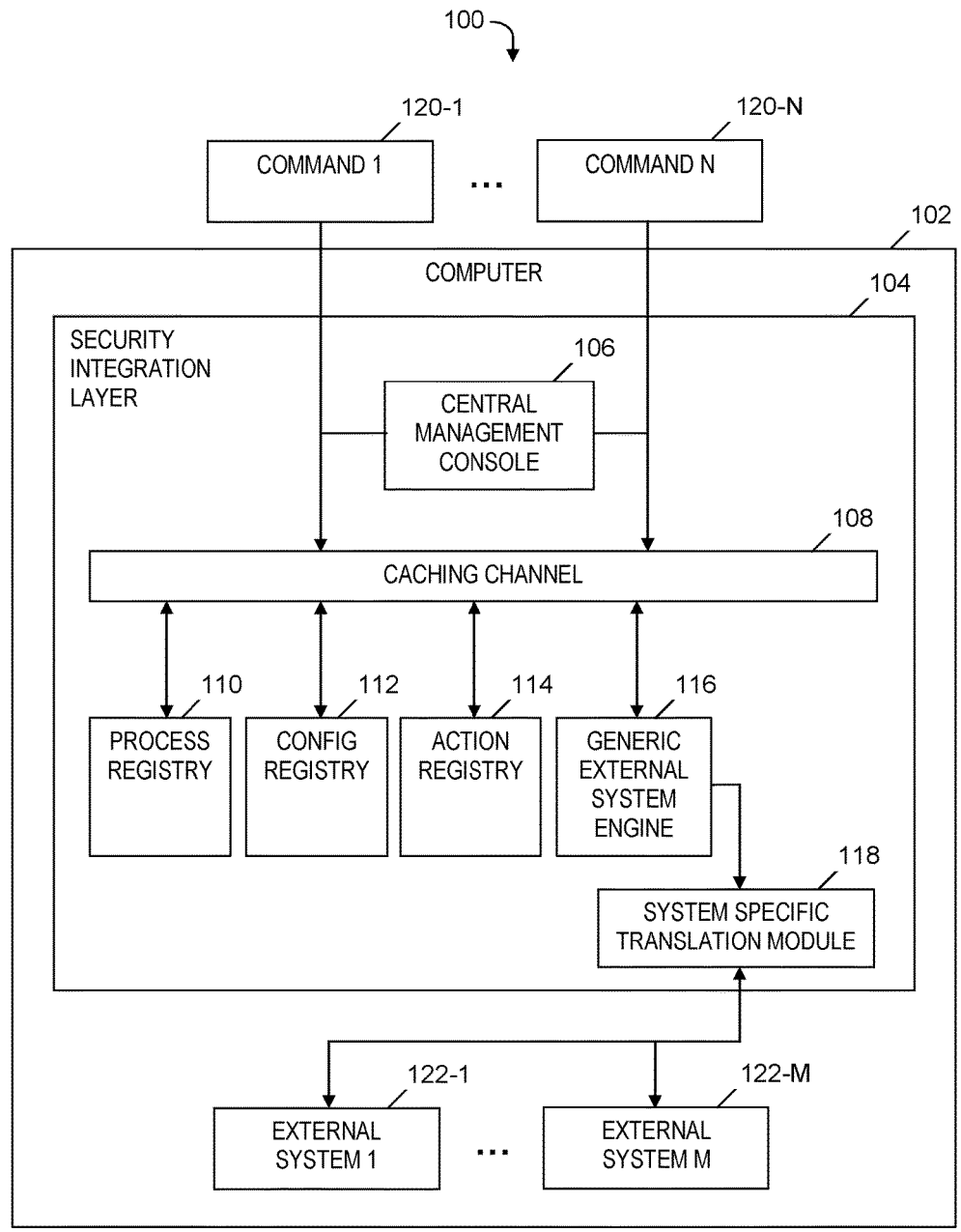
FIG. 1 is a block diagram of a system for delivering a configuration based workflow in an IT system integrated with a rules engine, in accordance with embodiments of the present invention.

Embodiments of the present invention provide a security integration layer between the user and the operating system (OS) in an IT system. The security integration layer interacts with the OS through a process daemon in the kernel mode. The security integration layer acts on top of the OS to interpret each of user, application, and OS commands that perform critical system activities (e.g., system shutdown, system reboot, create a file system, format a newly assigned storage logical unit number (LUN), etc.) and intercept commands from any source or tool, such as an API connection, a maliciously written cron job, or a software tool or agent that attempts to perform an action that is destructive to the IT system, and make an informed decision about the intercepted commands based on a pre-configured logic (i.e., configuration rules). The interpreting and intercepting of commands by the security integration layer prevents or reduces operator errors, including intentional errors and accidental errors. Components of the security integration layer include (1) a process registry, (2) a config registry, (3) an action registry, and (4) APIs to external systems, which are described in more detail in the discussion of FIG. 1 presented below.

A unique challenge in a UNIX® environment is the lack of defined ways to control activities by a privileged user (i.e., root user). After a user logs into the UNIX® system as a root user, that user obtains access to all the commands as a privileged user. A subsequent human error by the privileged user may issue a shutdown or reboot command which may kill live application and database processes. If database transactions are happening at the time of the shutdown or reboot sequence, data may be corrupted. Thus, an unknowingly invoked command may cause critical business functionalities to be lost. Embodiments disclosed herein avoid the aforementioned human error issues by evaluating the command with a set of pre-conditions. As one example with regard to a shutdown command, the set of pre-conditions may include validating change control by interacting with a ticketing system, validating recent backups by interacting with a job scheduling system, and identifying and shutting down database instances.

In one embodiment, before the operator commands reach the OS kernel, the commands are subjected to parsing, and are automatically evaluated against configuration rules and an application of customizable corporate security models.

In one embodiment, the security integration layer is integrated with APIs of external systems (e.g., ticketing systems, change management database (CMDB) systems, maintenance/downtime repositories, enterprise batch management tools, and system monitoring agents) to provide intelligent and automated decisions about whether operator commands are to be allowed and executed to perform action(s) or disallowed and terminated so that the action(s) are not performed. If an operator command is disallowed and terminated so that an action associated with the command is not performed, the security integration layer may make an intelligent and automated decision to determine whether one or more other actions are executed.

Embodiments of the present invention may be bundled as part of a standard system offering or with a cloud offering.

System for Delivering Configuration Based Workflows

FIG. 1 is a block diagram of a system 100 for delivering a configuration based workflow in an IT system, in accordance with embodiments of the present invention. System 100 includes a computer 102, which executes a security integration layer 104 (i.e., a software-based security integration system). Security integration layer 104 includes a central management console 106, a caching channel 108, a process registry 110, a config registry 112, an action registry 114, a generic external system engine 116, and a system specific translation module 118.

Security integration layer 104 receives and interprets commands 120-1, . . . , 120-N, which includes user and/or application commands, and where N is an integer greater than or equal to one. Security integration layer 104 interacts with an operating system (OS) (not shown) of computer 102 through a process daemon in the kernel mode. Security integration layer 104 acts on top of the OS to interpret each of the commands 120-1, . . . , 120-N and, based on pre-configured rules, makes informed decisions about validating each of the commands 120-1, . . . , 120-N and whether to continue the execution of each of the commands 120-1, . . . , 120-N.

Process registry 110 includes a list of processes and commands that are designated as being managed and controlled by security integration layer 104. If the command or process is listed in the process registry 110, security integration layer 104 transfers control to config registry 112.

Config registry 112 includes a set of configurable parameters and pre-configured conditions against which each of commands 120-1, . . . , 120-N is checked to validate commands 120-1, . . . , 120-N. For example, config registry 112 may include a pre-configured condition that indicates that a validation of a command must include interfacing with an external ticketing system included in external system 122-1, . . . , external system 122-M, where M is an integer greater than or equal to one. Interfacing with the external ticketing system ensures that a valid change management exists for the command. In response to config registry 112 validating the command against the set of parameters and pre-configured conditions, security integration layer 104 transfers control to action registry 114.

Action registry 114 includes configurable action(s) that are performed in response to config registry 112 successfully validating a command included in commands 120-1, . . . , 120-N. Action registry 114 may be configured in multiple ways: (1) execute the command; (2) abort the command; or (3) initiate additional actions.

Process registry 110, config registry 112, and action registry 114 are managed centrally by central management console 106, but are cached locally by caching channel 108.

Generic external system engine 116 includes APIs that are used to communicate with external system 122-1, . . . , external system 122-M, where M is an integer greater than or equal to one. The aforementioned communication with external systems 122-1, . . . , 122-M results in receiving additional queries and transmitting additional responses to make final decisions about whether each of commands 120-1, . . . , 120-N is successfully validated.

Security integration layer 104 runs local to the IT system. Security integration layer 104 utilizes caching channel 108 to avoid or reduce any transit delays (i.e., latencies during the evaluation of commands 120-1, . . . , 120-N or configuration changes). Central management console 106 provides centralized administration capabilities, which allow control of other systems (not shown) that include respective security integration layers (not shown) that provide the functionalities of security integration layer 104.

Security integration layer 104 intercepts destructive commands included in commands 120-1, . . . , 120-N from any source or software tool (e.g., API connection, a maliciously written cron job, or a software agent or tool that attempts to perform an action which is destructive to system 100).

In one embodiment, security integration layer 104 is integrated at the OS layer of system 100 to external systems 122-1, . . . , 122-M. In one embodiment, external systems 122-1, . . . , 122-M include ticketing systems or other permission driven systems to communicate via socket or other means, using Extensible Markup Language (XML) data over SOAP (originally Simple Object Access Protocol) over Hypertext Transfer Protocol over Transport Layer Security (HTTPS). In one embodiment, security integration layer 104 may use the XML data to perform configured additional checks with external systems 122-1, . . . , 122-M.

In one embodiment, external systems 122-1, . . . , 122-M include a ticketing system, a configuration management database system, a monitoring system that provides operations and network management, and/or a job scheduling system, which ensures no job is running during the validation of one of commands 120-1, . . . , 120-N, checks approved downtimes, checks maintenance windows, etc.

In one embodiment, the communication that security integration layer 104 has with external systems 122-1, . . . , 122-M is wrapped into generic external system engine 116 to receive and transmit additional queries and responses to make a final decision about validating and executing each of commands 120-1, . . . , 120-N.

In an alternate embodiment, security integration layer 104 intercepts OS commands and sub-system commands (e.g., from a database system, middleware, etc.) via any incoming protocol such as Open Database Connectivity (ODBC).

Figure 2:
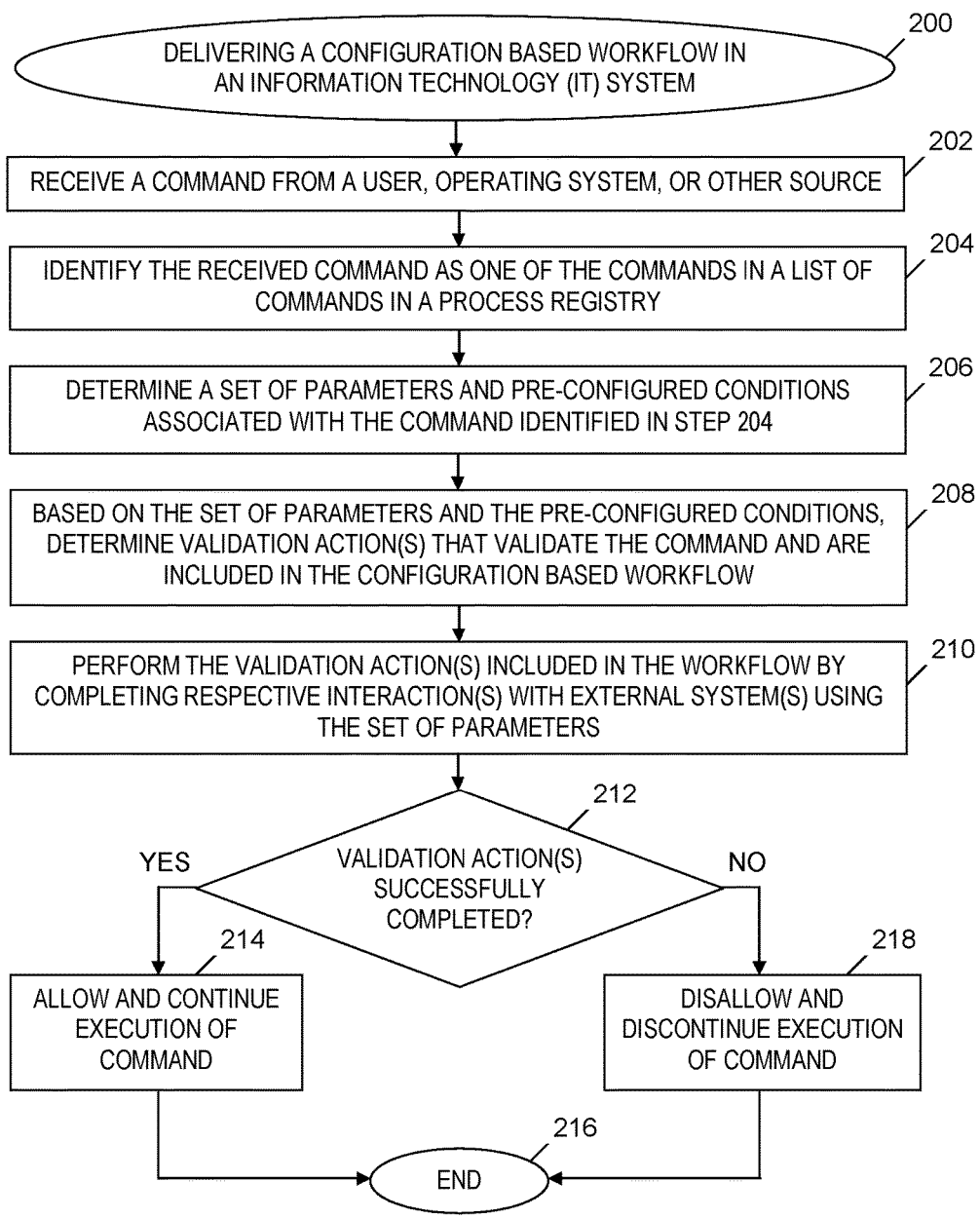
FIG. 2 is a flowchart of a process of delivering a configuration based workflow in an IT system integrated with a rules engine, in accordance with embodiments of the present invention.
Figure 4:
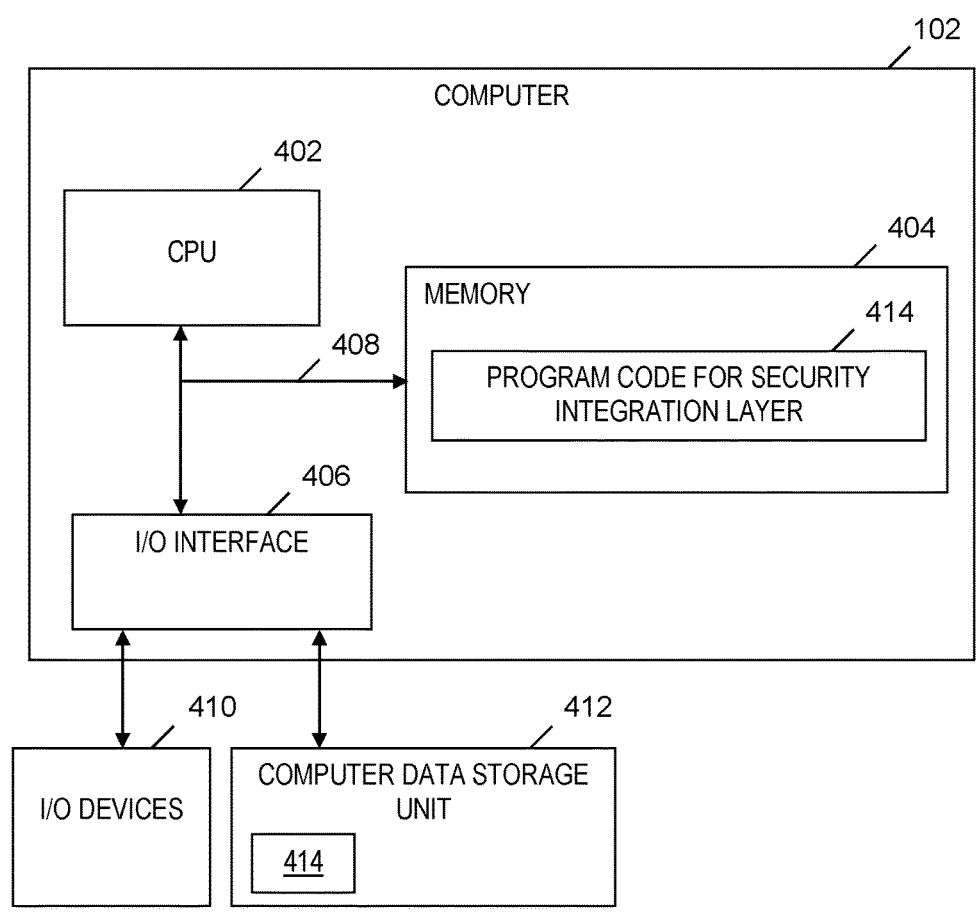
FIG. 4 is a block diagram of a computer included in the system of FIG. 1 and that implements the process of FIG. 2, in accordance with embodiments of the present invention.

The functionality of the components shown in FIG. 1 is described in more detail in the discussion of FIG. 2 and FIG. 4 presented below.

Process for Delivering Configuration Based Workflows

FIG. 2 is a flowchart of a process of delivering a configuration based workflow in an IT system integrated with a rules engine, in accordance with embodiments of the present invention. The process of FIG. 2 starts at step 200. In step 202, security integration layer 104 (see FIG. 1) receives a command 120-1 (see FIG. 1) from a user, operating system, or another source.

In step 204, security integration layer 104 (see FIG. 1) identifies the command received in step 202 as one of the commands in a list of commands included in process registry 110 (see FIG. 1).

In step 206, security integration layer 104 (see FIG. 1) determines a set of parameters and pre-configured conditions associated with the command identified in step 204.

In step 208, based on the set of parameters and the pre-configured conditions determined in step 206, security integration layer 104 (see FIG. 1) determines validation action(s) that validate command 120-1 (see FIG. 1) and that are included in the configuration based workflow.

In step 210, security integration layer 104 (see FIG. 1) performs the validation action(s) determined in step 208 by completing respective interaction(s) with external system(s)

included in external systems 122-1, ..., 122-M (see FIG. 1), where the interaction(s) utilize the set of parameters determined in step 206.

In step 212, security integration layer 104 (see FIG. 1) determines whether the validation action(s) performed in step 210 were successfully completed. If the validation action(s) were determined in step 212 to be successfully completed, then the Yes branch of step 212 is taken and step 214 is performed.

In step 214, security integration layer 104 (see FIG. 1) allows and continues the execution of command 120-1 (see FIG. 1). Following step 214, the process of FIG. 2 ends at step 216.

Returning to step 212, if security integration layer 104 (see FIG. 1) determines that at least one of the validation action(s) was not successfully completed, then the No branch of step 212 is taken and step 218 is performed.

In step 218, security integration layer 104 (see FIG. 1) disallows and discontinues the execution of command 120-1 (see FIG. 1). Following step 218, the process of FIG. 2 ends at step 216.

EXAMPLES

Figure 3A:
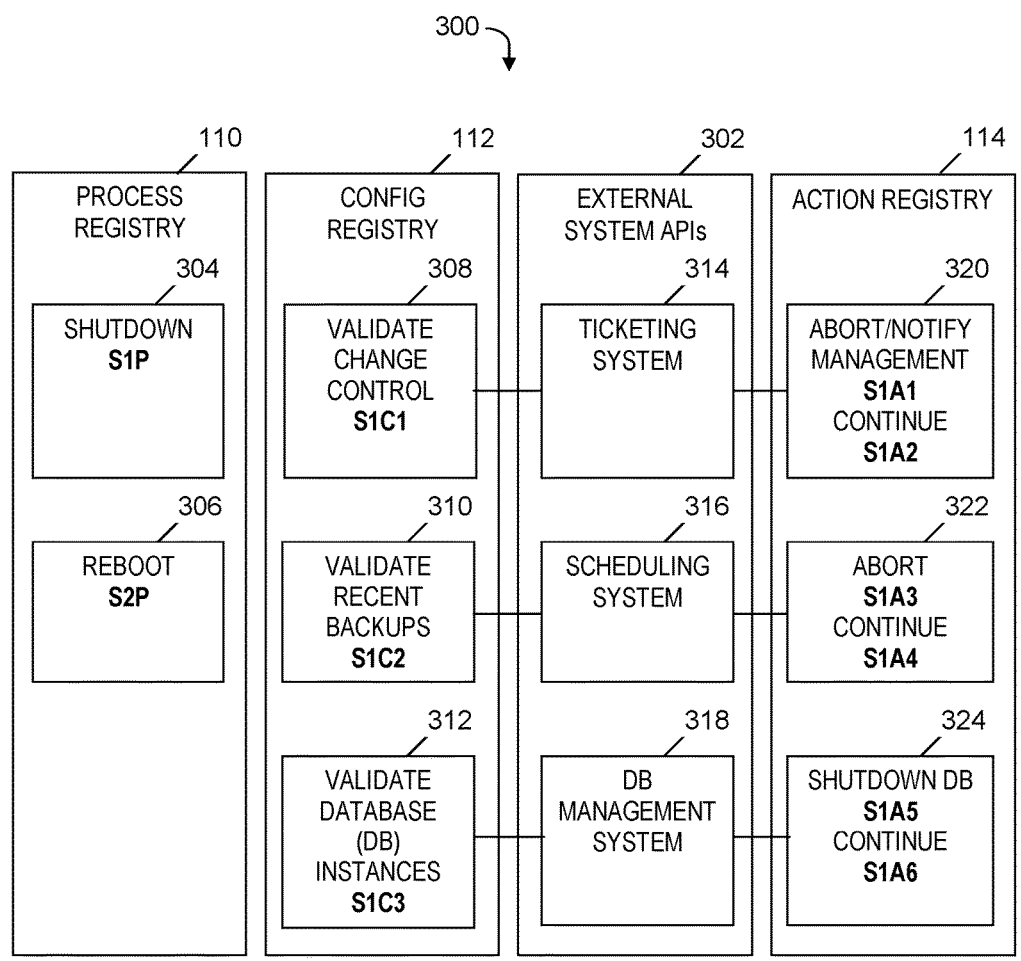
FIG. 3A depicts an example of registries and APIs used in the process of FIG. 2, in accordance with embodiments of the present invention.

FIG. 3A depicts an example 300 of registries and APIs used in the process of FIG. 2, in accordance with embodiments of the present invention. Example 300 includes process registry 110, config registry 112, external system APIs 302, and action registry 114. Process registry 110 includes a shutdown command 304 to complete a process S1P and a reboot command 306 to complete a process S2P.

Config registry 112 includes sequences S1C1, S1C2, and S1C3 for the following validation actions, respectively: validate change control 308, validate recent backups 310, and validate database instances 312.

External system APIs include APIs to communicate with a ticketing system 314, a scheduling system 316, and a database management system 318. The APIs for communication with database management system 318 may include JDBC or ODBC.

Action registry 114 specifies sequences S1A1 (i.e., abort the command and notify management of the command being aborted) and S1A2 (i.e., continue the execution of the command), which are associated with results of config registry 112 performing validate change control 308 (i.e., sequence S1C1) by interacting with ticketing system 314 via APIs included in external system APIs 302.

Further, action registry 114 specifies sequences S1A3 (i.e., abort the command) and S1A4 (i.e., continue the execution of the command), which are associated with results of config registry 112 performing validate recent backups 310 (i.e., sequence S1C2) by interacting with scheduling system 316 via APIs included in external system APIs 302.

Still further, action registry 114 specifies sequences S1A5 (i.e., shut down the database) and S1A6 (i.e., continue the execution of the command), which are associated with results of config registry 112 performing validate database instances 312 (i.e., sequence S1C3) by interacting with database management system 318 via APIs (e.g., JDBC or ODBC) included in external system APIs 302.

The usage of registries 110, 112, and 114 and external system APIs 302 to identify and validate a command and perform action(s) based on the results of the validation of the command using the process of FIG. 2 is described below relative to the example depicted in FIGS. 3B-3C.

Figure 3B:
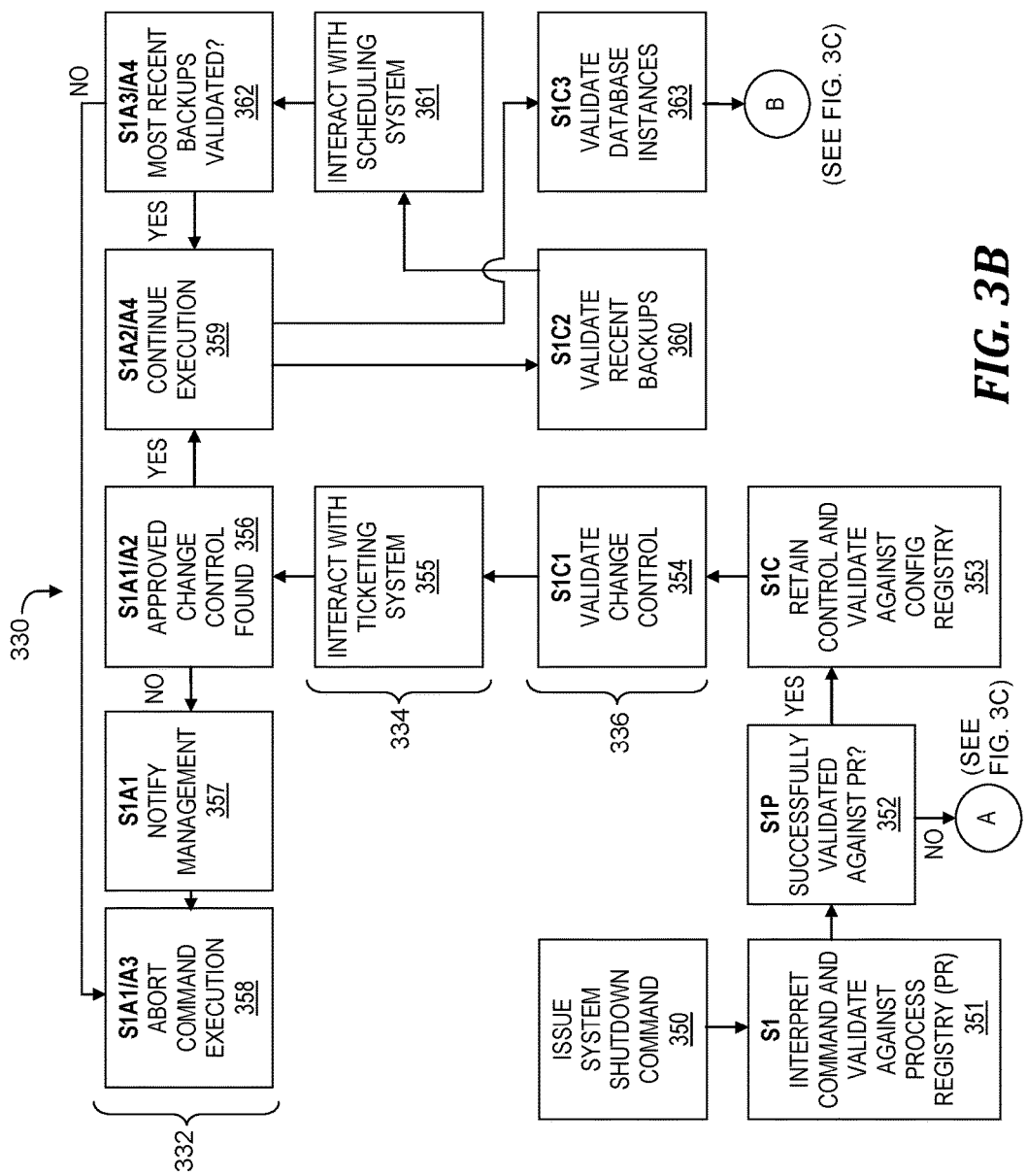
FIGS. 3B-3C depict an example of the process of FIG. 2 using the registries and APIs in FIG. 3A, in accordance with embodiments of the present invention.
Figure 3C:
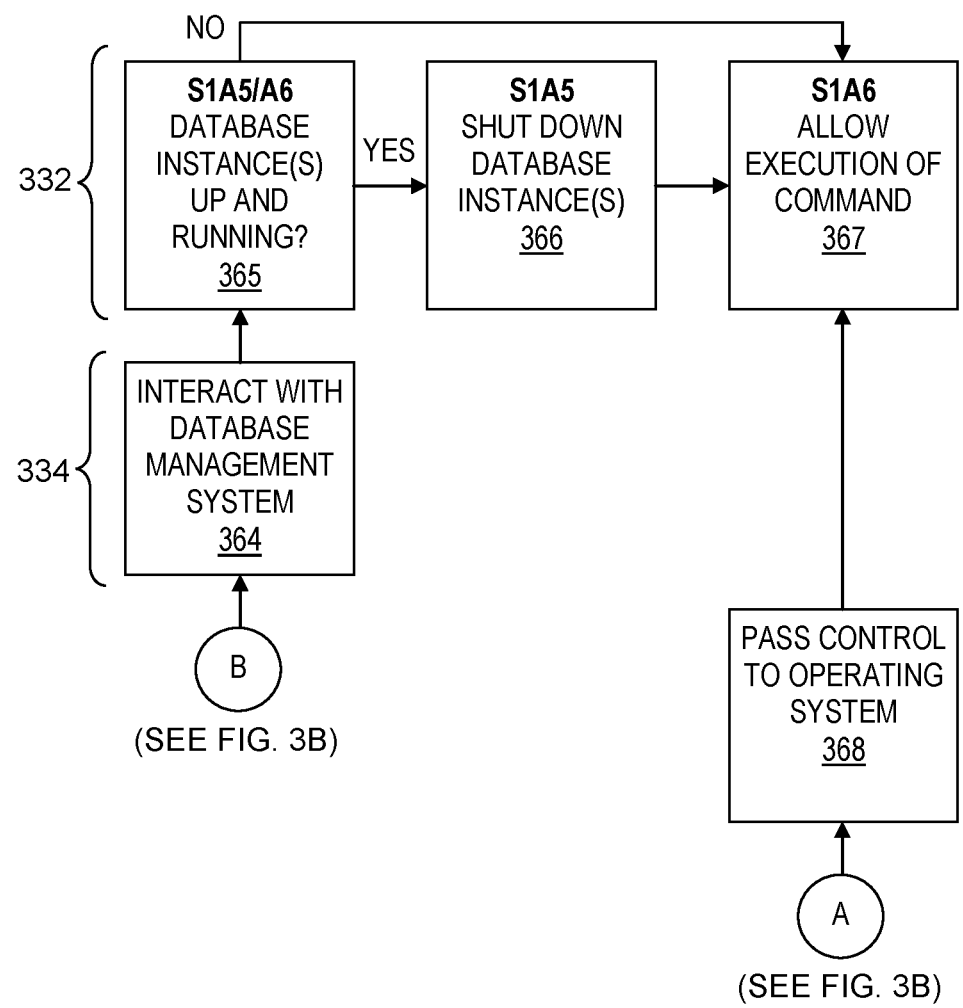

FIGS. 3B-3C depict an example 330 of the process of FIG. 2 using the registries and APIs in FIG. 3A, in accordance with embodiments of the present invention. Example 330 includes actions 332 performed by action registry 114 (see FIG. 3A), actions 334 performed by APIs 302 (see FIG. 3A) included in generic external system engine 116 (see FIG. 1), and actions 336 performed by config registry 112 (see FIG. 3A). The process in example 330 starts at step 350 with a system administrator or another user of an IT system issuing a system shutdown command (i.e., initiating a shutdown of the IT system). Hereinafter, in the discussion of FIGS. 3B-3C, the system shutdown command issued in step 350 is referred to simply as "the command." Security integration layer 104 (see FIG. 1) receives the command in step 202 (see FIG. 2).

In step 351 (i.e., sequence S1), security integration layer 104 (see FIG. 1) interprets the command and validates the command against process registry 110 (see FIG. 3A).

In step 352 (i.e., process S1P), security integration layer 104 (see FIG. 1) determines whether the validation in step 351 is successful (i.e., a successful validation indicates that the command was found in a pre-configured list of commands included in process registry 110 (see FIG. 3A)). Steps 351 and 352 are included in step 204 (see FIG. 2).

If security integration layer 104 (see FIG. 1) determines in step 352 that the validation in step 351 is successful, then the Yes branch of step 352 is followed and step 353 is performed.

Step 206 (see FIG. 2) precedes step 353. In step 353 (i.e., sequence S1C), security integration layer 104 (see FIG. 1) retains control of the processing of the command and initiates validations of the command against pre-configured conditions defined in config registry 112 (see FIG. 1). The pre-conditions consist of validating (i) the change control, (ii) the most recent backups, and (iii) the database instances.

In step 354 (i.e., sequence S1C1), security integration layer 104 (see FIG. 1) initiates a validation of the change control for the command, which attempts to confirm that an approved change record exists. In step 355, security integration layer 104 (see FIG. 1) interacts with ticketing system 314 (see FIG. 3A) via an API in external systems APIs 302 (see FIG. 3A). Steps 354 and 355 are included in step 210 (see FIG. 2).

In step 356 (i.e., sequence S1A1 or S1A2), security integration layer 104 (see FIG. 1) determines whether the approved change record exists. In step 356, if security integration layer 104 (see FIG. 1) determines that the approved change record does not exist, then the No branch of step 356 is followed and steps 357 and 358 are performed to complete further actions as configured in action registry 114 (see FIG. 3A). Step 356 is included in step 212 (see FIG. 2).

In step 357 (i.e., part of sequence S1A1), in response to the approved change control not being found in step 356, security integration layer 104 (see FIG. 1) sends a notification to management that indicates that no approved change control was found. In step 358, in response to the approved change control not being found in step 356, security integration layer 104 (see FIG. 1) aborts the execution of the command. Step 358 is included in step 218 (see FIG. 2).

Returning to step 356, if security integration layer 104 (see FIG. 1) determines that the approved change record exists, then the Yes branch of step 356 is followed and step 359 is performed.

In step 359 (i.e., sequence S1A2), in response to an approved change control being found in step 356, security integration layer 104 (see FIG. 1) continues the execution of the command by continuing the validation of the command using the remaining pre-conditions mentioned in step 353. Step 359 is included in step 214 (see FIG. 2).

In step 360 (i.e., sequence S1C2), subsequent to a successful completion of the validation in sequence S1C1, security integration layer 104 (see FIG. 1) initiates the validation of the most recent backups (i.e., backups that occurred within a predefined time period immediately preceding the current time), which is the next pre-configured condition in config registry 112 (see FIG. 3A).

In step 361, security integration layer 104 (see FIG. 1) interacts with scheduling system 316 (see FIG. 3A) via an API in external systems APIs 302 (see FIG. 3A). In step 362 (i.e., sequence S1A3 or S1A4), security integration layer 104 (see FIG. 1) determines whether the most recent backups are validated. Steps 360 and 361 are included in step 210 (see FIG. 2).

In step 362, if security integration layer 104 (see FIG. 1) determines that the most recent backups are not validated, then the No branch of step 362 is followed and step 358 is performed in sequence S1A3, which aborts the execution of the command. In step 362, if security integration layer 104 (see FIG. 1) determines that the most recent backups are validated, then the Yes branch of step 362 is followed and step 359 is performed in sequence S1A4, which continues the execution of the command by continuing the validation of the command using the remaining pre-condition included in config registry 112 (see FIG. 3A). Step 362 is included in step 212 (see FIG. 2).

In step 363 (i.e., sequence S1C3), subsequent to a successful completion of the validation in sequence S1C2, security integration layer 104 (see FIG. 1) initiates the validation of the database instances, which is the next pre-configured condition in config registry 112 (see FIG. 3A).

Following step 363, the process continues with step 364 in FIG. 3C. FIG. 3C includes actions 332 performed by action registry 114 (see FIG. 3A) and an action 334 performed by APIs 302 (see FIG. 3A) included in generic external system engine 116 (see FIG. 1). In step 364 in FIG. 3C, security integration layer 104 (see FIG. 1) interacts with database management system 318 (see FIG. 3A) via an API in external systems APIs 302 (see FIG. 3A). Step 363 (see FIG. 3B) and step 364 are included in step 210 (see FIG. 2).

In step 365 (i.e., sequence S1A5 or S1A6), based on the interaction with database management system 318 (see FIG. 3A), security integration layer 104 (see FIG. 1) determines whether database instances are up and running. In step 365, if security integration layer 104 (see FIG. 1) determines that database instance(s) are up and running, then the Yes branch of step 365 is followed and step 366 is performed. Step 365 is included in step 212 (see FIG. 2).

In step 366, in response to determining that the database instance(s) are up and running in step 365, security integration layer 104 (see FIG. 1) initiates sequence S1A5 and shuts down the database instance(s). In step 367, in response to determining that the database instance(s) are up and running in step 365, security integration layer 104 (see FIG. 1) initiates sequence S1A6 and allows the execution of the command to be completed, which results in the IT system being shut down. Step 367 is included in step 214 (see FIG. 2).

Returning to step 365, if security integration layer 104 (see FIG. 1) determines that no database instance is up and running, then the No branch of step 365 is followed and step 367 is performed, which allows the execution of the command to be completed, which results in the IT system being shut down.

Returning to step 352 in FIG. 3B, if security integration layer 104 (see FIG. 1) determines that the command was not found in the pre-configured list of commands included in process registry 110 (see FIG. 3A), then step 368 in FIG. 3B is performed. In step 368, security integration layer 104 (see FIG. 1) passes control of the command to the operating system of the IT system and in step 367, security integration layer 104 (see FIG. 1) allows the execution of the command to be completed.

Although the process in FIGS. 3B-3C is presented as an example, the logic and steps in the process in FIGS. 3B-3C is one embodiment of the present invention.

Computer System

FIG. 4 is a block diagram of a computer included in the system of FIG. 1 and that implements the process of FIG. 2, in accordance with embodiments of the present invention. Computer 102 is a computer system that generally includes a central processing unit (CPU) 402, a memory 404, an input/output (I/O) interface 406, and a bus 408. Further, computer 102 is coupled to I/O devices 410 and a computer data storage unit 412. CPU 402 performs computation and control functions of computer 102, including executing instructions included in program code 414 for security integration layer 104 (see FIG. 1) to perform a method of delivering a configuration based workflow in an IT system, where the instructions are executed by CPU 402 via memory 404. CPU 402 may include a single processing unit, or be distributed across one or more processing units in one or more locations (e.g., on a client and server).

Memory 404 includes a known computer readable storage medium, which is described below. In one embodiment, cache memory elements of memory 404 provide temporary storage of at least some program code (e.g., program code 414) in order to reduce the number of times code must be retrieved from bulk storage while instructions of the program code are executed. Moreover, similar to CPU 402, memory 404 may reside at a single physical location, including one or more types of data storage, or be distributed across a plurality of physical systems in various forms. Further, memory 404 can include data distributed across, for example, a local area network (LAN) or a wide area network (WAN).

I/O interface 406 includes any system for exchanging information to or from an external source. I/O devices 410 include any known type of external device, including a display, keyboard, etc. Bus 408 provides a communication link between each of the components in computer 102, and may include any type of transmission link, including electrical, optical, wireless, etc.

I/O interface 406 also allows computer 102 to store information (e.g., data or program instructions such as program code 414) on and retrieve the information from computer data storage unit 412 or another computer data storage unit (not shown). Computer data storage unit 412 includes a known computer-readable storage medium, which is described below. In one embodiment, computer data storage unit 412 is a non-volatile data storage device, such as a magnetic disk drive (i.e., hard disk drive) or an optical disc drive (e.g., a CD-ROM drive which receives a CD-ROM disk).

Memory 404 and/or storage unit 412 may store computer program code 414 that includes instructions that are executed by CPU 402 via memory 404 to deliver a configuration based workflow in an IT system. Although FIG. 4 depicts memory 404 as including program code, the present invention contemplates embodiments in which memory 404 does not include all of code 414 simultaneously, but instead at one time includes only a portion of code 414.

Further, memory 404 may include an operating system (not shown) and may include other systems not shown in FIG. 4.

Storage unit 412 and/or one or more other computer data storage units (not shown) that are coupled to computer 102 may include parameters and pre-configured conditions which are the bases of validation actions associated with command 120-1, . . . , command 120-N (see FIG. 1).

As will be appreciated by one skilled in the art, in a first embodiment, the present invention may be a method; in a second embodiment, the present invention may be a system; and in a third embodiment, the present invention may be a computer program product.

Any of the components of an embodiment of the present invention can be deployed, managed, serviced, etc. by a service provider that offers to deploy or integrate computing infrastructure with respect to delivering a configuration based workflow in an IT system. Thus, an embodiment of the present invention discloses a process for supporting computer infrastructure, where the process includes providing at least one support service for at least one of integrating, hosting, maintaining and deploying computer-readable code (e.g., program code 414) in a computer system (e.g., computer 102) including one or more processors (e.g., CPU 402), wherein the processor(s) carry out instructions contained in the code causing the computer system to deliver a configuration based workflow in an IT system. Another embodiment discloses a process for supporting computer infrastructure, where the process includes integrating computer-readable program code into a computer system including a processor. The step of integrating includes storing the program code in a computer-readable storage device of the computer system through use of the processor. The program code, upon being executed by the processor, implements a method of delivering a configuration based workflow in an IT system.

While it is understood that program code 414 for delivering a configuration based workflow in an IT system may be deployed by manually loading directly in client, server and proxy computers (not shown) via loading a computer-readable storage medium (e.g., computer data storage unit 412), program code 414 may also be automatically or semi-automatically deployed into computer 102 by sending program code 414 to a central server or a group of central servers. Program code 414 is then downloaded into client computers (e.g., computer 102) that will execute program code 414. Alternatively, program code 414 is sent directly to the client computer via e-mail. Program code 414 is then either detached to a directory on the client computer or loaded into a directory on the client computer by a button on the e-mail that executes a program that detaches program code 414 into a directory. Another alternative is to send program code 414 directly to a directory on the client computer hard drive. In a case in which there are proxy servers, the process selects the proxy server code, determines on which computers to place the proxy servers' code, transmits the proxy server code, and then installs the proxy server code on the proxy computer. Program code 414 is transmitted to the proxy server and then it is stored on the proxy server.

Another embodiment of the invention provides a method that performs the process steps on a subscription, advertising and/or fee basis. That is, a service provider, such as a Solution Integrator, can offer to create, maintain, support, etc. a process of delivering a configuration based workflow in an IT system. In this case, the service provider can create, maintain, support, etc. a computer infrastructure that performs the process steps for one or more customers. In return, the service provider can receive payment from the customer(s) under a subscription and/or fee agreement, and/or the service provider can receive payment from the sale of advertising content to one or more third parties.

The present invention may be a system, a method, and/or a computer program product at any possible technical detail level of integration. The computer program product may include a computer readable storage medium (or media) (i.e., memory 404 and computer data storage unit 412) having computer readable program instructions 414 thereon for causing a processor (e.g., CPU 402) to carry out aspects of the present invention.

The computer readable storage medium can be a tangible device that can retain and store instructions (e.g., program code 414) for use by an instruction execution device (e.g., computer 102). The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions (e.g., program code 414) described herein can be downloaded to respective computing/processing devices (e.g., computer 102) from a computer readable storage medium or to an external computer or external storage device (e.g., computer data storage unit 412) via a network (not shown), for example, the Internet, a local area network, a wide area network and/or a wireless network. The network may comprise copper transmission cables, optical transmission fibers, wireless transmission, routers, firewalls, switches, gateway computers and/or edge servers. A network adapter card (not shown) or network interface (not shown) in each computing/processing device receives computer readable program instructions from the network and forwards the computer readable program instructions for storage in a computer readable storage medium within the respective computing/processing device.

Computer readable program instructions (e.g., program code 414) for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations (e.g., FIG. 2) and/or block diagrams (e.g., FIG. 1 and FIG. 4) of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions (e.g., program code 414).

These computer readable program instructions may be provided to a processor (e.g., CPU 402) of a general purpose computer, special purpose computer, or other programmable data processing apparatus (e.g., computer 102) to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium (e.g., computer data storage unit 412) that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions (e.g., program code 414) may also be loaded onto a computer (e.g. computer 102), other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While embodiments of the present invention have been described herein for purposes of illustration, many modifications and changes will become apparent to those skilled in the art. Accordingly, the appended claims are intended to encompass all such modifications and changes as fall within the true spirit and scope of this invention.

What is claimed is:

1. A method of delivering a configuration based workflow in an IT system, the method comprising the steps of:
a computer identifying a command as being included in a list of commands, the command being initiated for an execution;
in response to the step of identifying the command, the computer determining a set of parameters and pre-configured conditions associated with the identified command;
based on the set of parameters and the pre-configured conditions, the computer determining one or more validation actions that validate the command and are included in the configuration based workflow, the one or more validation actions specified by respective one or more interactions with one or more external systems;
the computer performing the one or more validation actions included in the configuration based workflow by completing the one or more interactions with the one or more external systems using the set of parameters;
the computer determining whether the one or more validation actions are successfully completed; and
if the one or more validation actions are successfully completed, the computer continuing the execution of the command, or if at least one of the one or more validation actions is not successfully completed, the computer discontinuing the execution of the command.

2. The method of claim 1, further comprising the step of if a validation action included in the one or more validation actions is not successfully completed, the computer performing one or more additional actions other than the step of discontinuing the execution of the command, wherein the step of performing the one more additional actions includes sending a notification indicating that the validation action was not successfully completed.

3. The method of claim 1, further comprising the step of if a validation action included in the one or more validation actions is successfully completed, the computer performing one or more additional actions other than the step of continuing the execution of the command.

4. The method of claim 1, wherein the step of completing the one or more interactions with one or more external systems includes completing an interaction with an external system selected from the group consisting of a configuration management database system, a ticketing system, a job scheduling system, a workload automation system, and an operations management system.

5. The method of claim 1, wherein the step of performing the one or more validation actions includes validating the command against multiple local security policies and policies of external systems which are interfacing systems to the IT system.

6. The method of claim 1, further comprising the step of prior to the step of identifying the command, the computer receiving the command (i) from a software tool using an application programming interface (API) connection, (ii) as part of a job executing in the IT system, the job being scheduled by a time-based job scheduler, or (iii) from a software agent.

7. The method of claim 1, further comprising the step of prior to the step of identifying the command, the computer receiving the command from an operating system or sub-system of the operating system.

8. The method of claim 1, further comprising the computer generating the list of commands, wherein the commands perform respective critical activities of the IT system, wherein at least one of the commands performs an action that is destructive to the IT system.

9. The method of claim 1, further comprising the step of:
providing at least one support service for at least one of creating, integrating, hosting, maintaining, and deploying computer readable program code in the computer, the program code being executed by a processor of the computer to implement the steps of identifying the command, determining the set of parameters and the pre-configured conditions, determining the one or more validation actions, performing the one or more validation actions, completing the one or more interactions with the one or more external systems using the set of parameters, determining whether the one or more validation actions are successfully completed, and continuing the execution of the command if the one or more validation actions are successfully completed, or discontinuing the execution of the command if any one of the one or more validation actions is not successfully completed.

10. A computer program product, comprising:
a computer readable storage medium and a computer readable program code stored in the computer readable storage medium, the computer readable program code containing instructions that are executed by a central processing unit (CPU) of a computer system to implement a method of delivering a configuration based workflow in an IT system, the method comprising the steps of:
the computer system identifying a command as being included in a list of commands, the command being initiated for an execution;
in response to the step of identifying the command, the computer system determining a set of parameters and pre-configured conditions associated with the identified command;
based on the set of parameters and the pre-configured conditions, the computer system determining one or more validation actions that validate the command and are included in the configuration based workflow, the one or more validation actions specified by respective one or more interactions with one or more external systems;
the computer system performing the one or more validation actions included in the configuration based workflow by completing the one or more interactions with the one or more external systems using the set of parameters;
the computer system determining whether the one or more validation actions are successfully completed; and
if the one or more validation actions are successfully completed, the computer system continuing the execution of the command, or if at least one of the one or more validation actions is not successfully completed, the computer system discontinuing the execution of the command.

11. The computer program product of claim 10, wherein the method further comprises the step of if a validation action included in the one or more validation actions is not successfully completed, the computer system performing one or more additional actions other than the step of discontinuing the execution of the command, wherein the step of performing the one more additional actions includes sending a notification indicating that the validation action was not successfully completed.

12. The computer program product of claim 10, wherein the method further comprises the step of if a validation action included in the one or more validation actions is successfully completed, the computer system performing one or more additional actions other than the step of continuing the execution of the command.

13. The computer program product of claim 10, wherein the step of completing the one or more interactions with one or more external systems includes completing an interaction with an external system selected from the group consisting of a configuration management database system, a ticketing system, a job scheduling system, a workload automation system, and an operations management system.

14. The computer program product of claim 10, wherein the step of performing the one or more validation actions includes validating the command against multiple local security policies and policies of external systems which are interfacing systems to the IT system.

15. The computer program product of claim 10, wherein the method further comprises the step of prior to the step of identifying the command, the computer system receiving the command (i) from a software tool using an application programming interface (API) connection, (ii) as part of a job executing in the IT system, the job being scheduled by a time-based job scheduler, or (iii) from a software agent.

16. The computer program product of claim 10, wherein the method further comprises the step of prior to the step of identifying the command, the computer system receiving the command from an operating system or sub-system of the operating system.

17. The computer program product of claim 10, wherein the method further comprises the computer system generating the list of commands, wherein the commands perform respective critical activities of the IT system, wherein at least one of the commands performs an action that is destructive to the IT system.

18. A computer system comprising:
a central processing unit (CPU);
a memory coupled to the CPU; and
a computer readable storage medium coupled to the CPU, the computer readable storage medium containing instructions that are executed by the CPU via the memory to implement a method of delivering a configuration based workflow in an IT system, the method comprising the steps of:
the computer system identifying a command as being included in a list of commands, the command being initiated for an execution;

in response to the step of identifying the command, the computer system determining a set of parameters and pre-configured conditions associated with the identified command;

based on the set of parameters and the pre-configured conditions, the computer system determining one or more validation actions that validate the command and are included in the configuration based workflow, the one or more validation actions specified by respective one or more interactions with one or more external systems;

the computer system performing the one or more validation actions included in the configuration based workflow by completing the one or more interactions with the one or more external systems using the set of parameters;

the computer system determining whether the one or more validation actions are successfully completed; and if the one or more validation actions are successfully completed, the computer system continuing the execution of the command, or if at least one of the one or more validation actions is not successfully completed, the computer system discontinuing the execution of the command.

19. The computer system of claim 18, wherein the method further comprises the step of if a validation action included in the one or more validation actions is not successfully completed, the computer system performing one or more additional actions other than the step of discontinuing the execution of the command, wherein the step of performing the one more additional actions includes sending a notification indicating that the validation action was not successfully completed.

20. The computer system of claim 18, wherein the method further comprises the step of if a validation action included in the one or more validation actions is successfully completed, the computer system performing one or more additional actions other than the step of continuing the execution of the command.

21. The computer system of claim 18, wherein the step of completing the one or more interactions with one or more external systems includes completing an interaction with an external system selected from the group consisting of a configuration management database system, a ticketing system, a job scheduling system, a workload automation system, and an operations management system.

22. The computer system of claim 18, wherein the step of performing the one or more validation actions includes validating the command against multiple local security policies and policies of external systems which are interfacing systems to the IT system.

23. The computer system of claim 18, wherein the method further comprises the step of prior to the step of identifying the command, the computer system receiving the command (i) from a software tool using an application programming interface (API) connection, (ii) as part of a job executing in the IT system, the job being scheduled by a time-based job scheduler, or (iii) from a software agent.

24. A method of delivering a configuration based workflow in an IT system, the method comprising the steps of:

a computer intercepting a command from a software tool that initiates an action that is destructive to the IT system;

the computer identifying the intercepted command as being included in a pre-configured list of commands, the identified command being initiated for an execution;

in response to the step of identifying the command, the computer determining a set of parameters and pre-configured conditions associated with the identified command;

based on the set of parameters and the pre-configured conditions, the computer generating Extensible Markup Language (XML) data;

the computer communicating with external systems via a generic external system engine by using the XML data over SOAP over Hypertext Transfer Protocol over Transport Security Layer (HTTPS), the external systems including a ticketing system for the IT system and a job scheduling system for the IT system;

in response to the step of communicating, the computer interfacing with the ticketing system in the configuration based workflow, which determines whether an approved change control exists for the identified command;

in response to the step of communicating, the computer interfacing with the job scheduling system in the configuration based workflow, which determines whether backups within a predetermined time period prior to the identified command being intercepted are validated; and if the approved change control exists and the backups are validated, the computer continuing the execution of the identified command, or if the approved change control does not exist, the computer terminating the execution of the identified command so that the IT system is not affected by the action that is destructive, or if the backups are not validated, the computer the computer terminating the execution of the identified command so that the IT system is affected by the action that is destructive.

25. A computer program product, comprising:

a computer readable storage medium and a computer readable program code stored in the computer readable storage medium, the computer readable program code containing instructions that are executed by a central processing unit (CPU) of a computer system to implement a method of delivering a configuration based workflow in an IT system, the method comprising the steps of:

the computer system intercepting a command from a software tool that initiates an action that is destructive to the IT system;

the computer system identifying the intercepted command as being included in a pre-configured list of commands, the identified command being initiated for an execution;

in response to the step of identifying the command, the computer system determining a set of parameters and pre-configured conditions associated with the identified command;

based on the set of parameters and the pre-configured conditions, the computer system generating Extensible Markup Language (XML) data;

the computer system communicating with external systems via a generic external system engine by using the XML data over SOAP over Hypertext Transfer Protocol over Transport Security Layer (HTTPS), the external systems including a ticketing system for the IT system and a job scheduling system for the IT system;

in response to the step of communicating, the computer system interfacing with the ticketing system in the configuration based workflow, which determines whether an approved change control exists for the identified command;

in response to the step of communicating, the computer system interfacing with the job scheduling system in the configuration based workflow, which determines whether backups within a predetermined time period prior to the identified command being intercepted are validated; and if the approved change control exists and the backups are validated, the computer system continuing the execution of the identified command, or if the approved change control does not exist, the computer system terminating the execution of the identified command so that the IT system is not affected by the action that is destructive, or if the backups are not validated, the computer system the computer system terminating the execution of the identified command so that the IT system is affected by the action that is destructive.

* * * * *